United States Patent
Agusa

(10) Patent No.: US 8,704,099 B2
(45) Date of Patent: Apr. 22, 2014

(54) GROMMET WITH SILENCER

(75) Inventor: Narihiro Agusa, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 100 days.

(21) Appl. No.: 13/503,887

(22) PCT Filed: Jun. 24, 2010

(86) PCT No.: PCT/JP2010/060715
§ 371 (c)(1),
(2), (4) Date: Apr. 25, 2012

(87) PCT Pub. No.: WO2011/089743
PCT Pub. Date: Jul. 28, 2011

(65) Prior Publication Data
US 2012/0211262 A1    Aug. 23, 2012

(30) Foreign Application Priority Data

Jan. 19, 2010  (JP) .................................. 2010-009385

(51) Int. Cl.
*H02G 3/22*    (2006.01)
(52) U.S. Cl.
USPC .................... 174/152 G; 174/153 G; 174/151; 16/2.2; 248/56
(58) Field of Classification Search
USPC .............. 174/152 G, 153 G, 151; 16/2.1, 2.2; 248/56
See application file for complete search history.

(56) References Cited

U.S. PATENT DOCUMENTS 5,981,877 A * 11/1999 Sakata et al. .............. 174/153 G

FOREIGN PATENT DOCUMENTS

| JP | 9-055138 | 2/1997 |
| JP | 11-046427 | 2/1999 |
| JP | 11-205957 | 7/1999 |
| JP | 2001-052551 | 2/2001 |
| JP | 2001-176346 | 6/2001 |
| JP | 2006-140011 | 6/2006 |

* cited by examiner

*Primary Examiner* — Dhirubhai R Patel
(74) *Attorney, Agent, or Firm* — Greenblum & Bernstein P.L.C.

(57) ABSTRACT

A grommet includes a small diameter tubular portion to which a wire harness is tightly fitted and inserted therethrough, and a large diameter tubular portion continuous to one end of the small diameter tubular portion. A silencer made of rubber is fitted within the large diameter tubular portion. The silencer includes a flat circular piece blocking a central cavity of the large diameter tubular portion. A wire harness insertion hole is provided on the flat circular piece communicating with the small diameter tubular portion of the grommet. A slit is provided from the wire harness insertion hole to an outer peripheral surface of the flat circular piece in order to insert the wire harness into the wire harness insertion hole with sideways insertion. The slit is provided with an irregularly shaped line portion to inhibit separation, configured with a keyhole-shaped or a dovetail groove-shaped line between both ends.

6 Claims, 4 Drawing Sheets

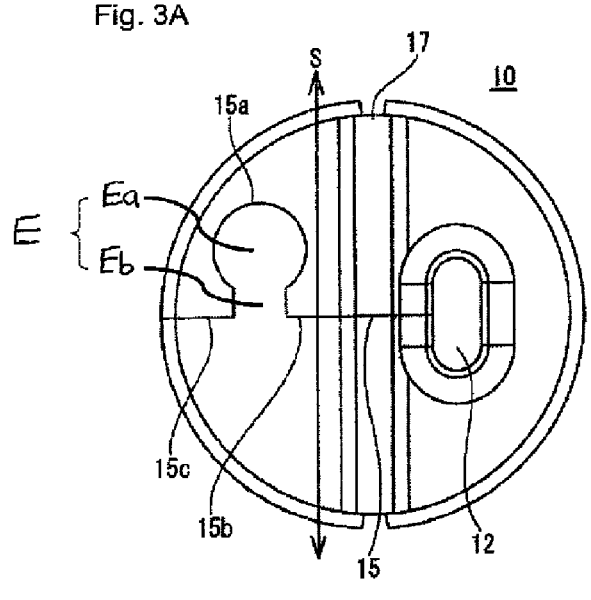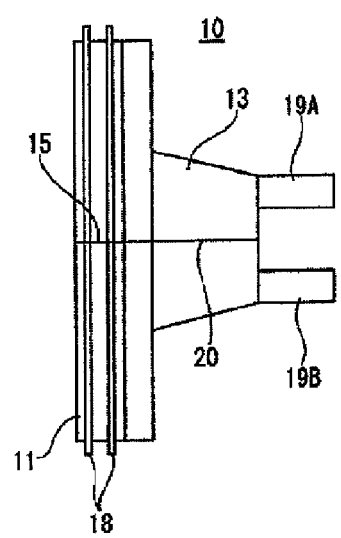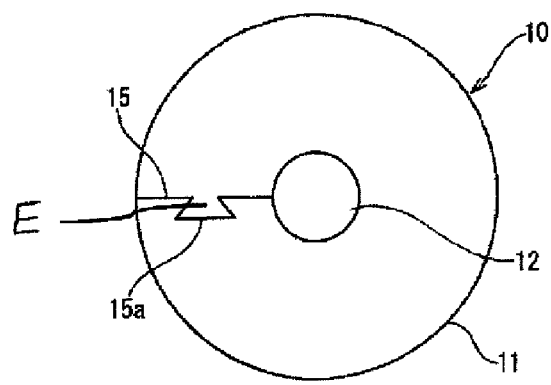

GROMMET WITH SILENCER

FIELD OF THE INVENTION

The present invention relates to a grommet with a silencer, and more specifically the silencer being attached to the grommet which is externally fitted around a wire harness inserted through a through-hole in a panel dividing a cabin interior and an engine compartment of an automobile so as to reduce transmission of noise from the engine compartment to the cabin interior. In particular, the present invention enables prevention of positioning drift of the silencer and thus stops the development of gaps through which sound leaks.

BACKGROUND OF THE INVENTION

Conventionally, in Japanese Patent Laid-open Publication No. H11-46427, as shown in FIG. 5A, a grommet 100 is attached to a wire harness W/H routed from an engine compartment X to a cabin interior Y of an automobile. The grommet 100 is then mounted to a through-hole H in a panel P dividing the engine compartment from the cabin interior to prevent water infiltration into the cabin interior. Also, in order to reduce or prevent transmission of noise from the engine compartment X to the cabin interior Y, there is a case where a silencer 110 is attached to the forefront of the grommet 100 positioned on the cabin interior Y side.

As shown in FIG. 5B, the silencer 110 has a double-layered configuration to which a vinyl chloride surface skin 110$b$ is bonded to a surface of a sound absorbing material 110$a$ configured with a cylindrical foam body. The sound absorbing material 110$a$ and the surface skin 110$b$ are provided with a straight-line slit 110$d$ running from the outer periphery to a central hole 110$c$. Further, the center of the surface skin 110$b$ is provided with a plurality of notches in a radial fashion forming a plurality of tongue tabs 110$e$ for attachment to the wire harness. The tongue tabs 110$e$ are fixated to the wire harness by winding a tape T therearound.

The attachment of the silencer 110 to the wire harness W/H takes place after the grommet 100 is mounted to the wire harness W/H. The silencer 110 is attached to the wire harness W/H in a state where an end face of the sound absorbing material 110$a$ in the silencer 110 directly contacts an end face 100$e$ of the grommet 100 without gaps. That is, after the wire harness W/H has been inserted into the central hole 110$c$ by opening the slit 110$d$ of the silencer 110, the attachment tongue tabs 110$e$ formed by cuts from the center of the surface skin 110$b$ are fixated to the wire harness W/H by winding the tape T therearound.

In this way, once the wire harness W/H to which the grommet 100 and the silencer 110 have been mounted has been passed through the through-hole H in the divider panel P from the engine compartment X to the cabin interior Y, by pulling the wire harness W/H back toward the engine compartment X side, the grommet 100 is engaged with the through-hole H in the divider panel P. In this state, a surface skin 150$a$ of a silencer 150 configured with urethane and glued to a cabin interior Y side of the divider panel P contacts a surface skin 110$b$ of the silencer 110, removing any gaps, and insulates the sound of noise from the engine compartment X.

RELATED ART

Patent Literature

Related Art 1: Japanese Patent Laid-open Publication No. H11-46427

SUMMARY OF THE INVENTION

Problems to Be Solved by the Invention

As described above, the silencer 110 is attached to the wire harness W/H by sideways insertion; thus, because the radial-direction slit 110$d$ is provided oriented from an outer periphery to the center, the silencer 110 is in a state where the wire harness W/H supports the silencer 110 at only one side. As shown in FIG. 6, there is therefore a risk that positioning drift may occur on either side of the slit 110$d$ and create a gap, thus producing sound leakage through the gap. In addition, because the silencer 110 is in direct contact only with a forefront face of the grommet 100, positioning drift is likely to develop at the slit 110$d$ of the silencer 110. Meanwhile, even in a case where the silencer 110 is fitted within an interior of the grommet 100, when the wire harness W/H is inserted and routed from the engine compartment X to the cabin interior Y, the grommet 100 is flexed to force the wire harness W/H through and, thus, the shape of the silencer 110 fitted within the grommet 100 is deformed and positioning drift is likely to develop at the slit 110$d$.

The present invention has been devised in view of the above-described circumstances and has as its advantage to enable prevention of the development of positioning drift for a slit provided to a silencer, thus stopping the development of gaps through which sound leaks, and to increase a sound insulation effect.

Means for Solving the Problems

In order to resolve the above circumstances, the present invention provides a grommet with a silencer in which the grommet is mounted on a wire harness routed through a through-hole in a vehicle body panel from an engine compartment side to a cabin interior side of an automobile. The grommet includes a small diameter tubular portion to which a wire harness is tightly fitted and inserted therethrough, and a large diameter tubular portion continuous to one end of the small diameter tubular portion and also provided on an outer peripheral surface with a vehicle body engagement concavity tightly fitted to a peripheral edge of the through-hole. The silencer is made of rubber and is inserted into and fitted within the large diameter tubular portion. The silencer includes a flat circular piece blocking a central cavity of the large diameter tubular portion in a direction substantially orthogonal to an axis thereof. The flat circular piece is provided with a wire harness insertion hole communicating with the small diameter tubular portion of the grommet. In addition, in order to insert the wire harness into the wire harness insertion hole with sideways insertion, a slit is provided from the wire harness insertion hole to an outer peripheral surface of the flat circular piece. The slit is provided with an irregularly shaped line portion to inhibit separation, configured in a keyhole-shaped or dovetail groove-shaped line between both ends which continues into a head portion which is unable to pass through a neck portion.

Specifically, for example, a diameter-direction concavity is preferably provided on the flat circular piece of the silencer; in addition, annular ribs which are tightly fitted to the inner peripheral surface of the large diameter tubular portion of the grommet are provided on the outer peripheral surface of the flat circular piece segmented by the concavity. It is further preferred that the wire harness insertion hole be provided eccentrically in an eccentric position in a first half-circle portion segmented by the concavity. In addition, the divided slit is preferably orthogonal to the concavity and is extended into a second half-circle portion. The irregularly shaped line portion is preferably provided in the second half-circle portion.

As described above, when the wire harness insertion hole occupies an eccentric position, the irregularly shaped line portion of the slit is provided to a side where the wire harness insertion hole is not provided, and also a diameter-direction concavity is provided between the irregularly shaped line portion and the wire harness insertion hole. Even in a case where the shape of the silencer is deformed by a pulling force or a pushing force carried by the wire harness being passed through the wire harness insertion hole, the concavity absorbs the shape deformation, thus enabling a reduction in the shape deformation effect on the irregularly shaped line portion of the slit and stopping the development of positioning drift.

Moreover, a small diameter tubular portion is preferably provided to the silencer protruding from the peripheral edge of the wire harness insertion hole. An extended slit continuous with the slit is preferably provided to the small diameter tubular portion in an axial line direction. The small diameter tubular portion is preferably fitted within the small diameter tubular portion of the grommet. In this way, when the small diameter tubular portion protruding from the silencer is fitted into the small diameter tubular portion of the grommet, the silencer can be positioned within the grommet and can be kept within the grommet without positioning drift. In this regard as well, the sound insulation performance can be increased.

Effect of the Invention

As described above, the grommet with the silencer according to the present invention includes the irregularly shaped line portion to inhibit separation, having the keyhole-shaped or dovetail groove-shaped line which is unlikely to develop positioning drift at the slit provided to the silencer for sideways insertion of the wire harness. Accordingly, when the grommet is inserted into a through-hole in the vehicle body panel, the slit in the silencer is unlikely to develop positioning displacement and can increase sound insulation performance without developing spaces through which sound leaks due to the positioning drift, both when the shape of the grommet deforms, and when a load affects the grommet and the wire harness after the grommet is mounted in the through-hole.

BRIEF DESCRIPTION OF THE DRAWINGS

FIG. 3A is a side view of the silencer and FIG. 3B is a front view thereof.

FIG. 4 is a general side view of a second embodiment.

MODE FOR CARRYING OUT THE INVENTION

Figure 1A:
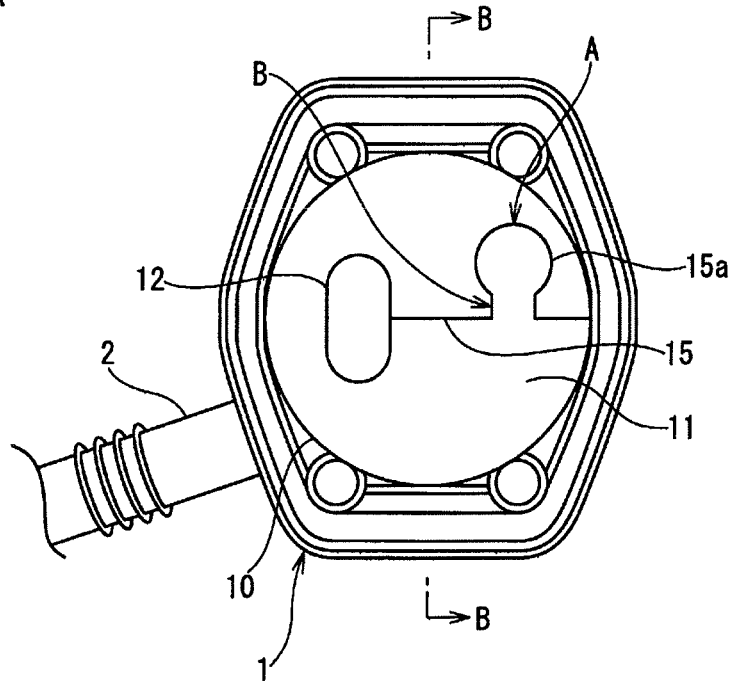
FIGS. 1A and 1B illustrate a state in which a silencer is attached to a grommet according to an embodiment of the present invention, FIG. 1A being a side view and FIG. 1B being a cross-sectional view along a line B-B.
Figure 1B:
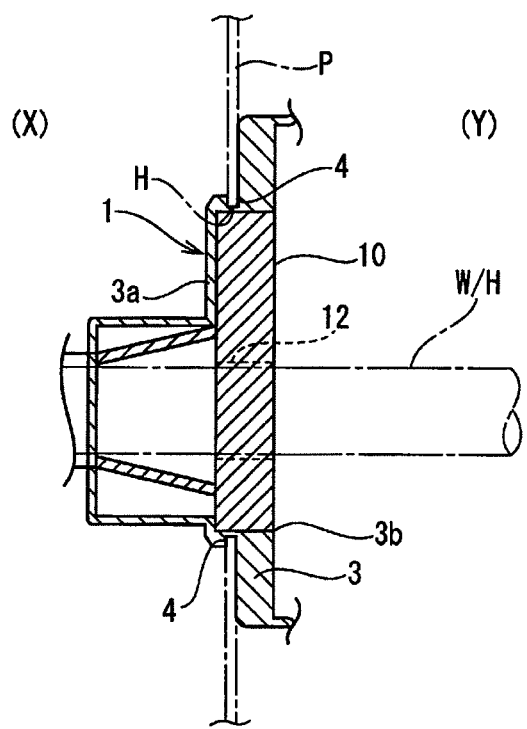

Hereinafter, an embodiment of the present invention is described with reference to the drawings. As shown in FIGS. 1A and 1B, a rubber or elastomer grommet 1 includes a small diameter tubular portion 2 to which the outer circumference of a bundle of electrical wires in a wire harness W/H is tightly fitted and inserted therethrough, and a large diameter tubular portion 3 continuous with one end of the small diameter tubular portion 2 and eccentric thereto. A vehicle body engagement concavity 4 is provided on the outer peripheral surface of the large diameter tubular portion 3. An end face 3a of the large diameter tubular portion 3 is eccentric to and continuous with the small diameter tubular portion 2 as described above, and the other end has an opening 3b.

Figure 2A:
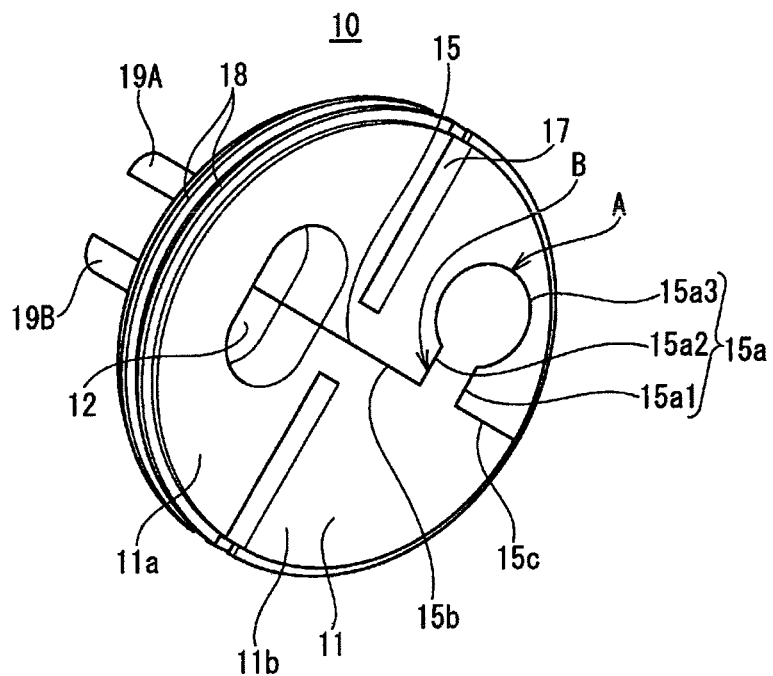
FIGS. 2A and 2B are perspective views of the silencer.
Figure 2B:
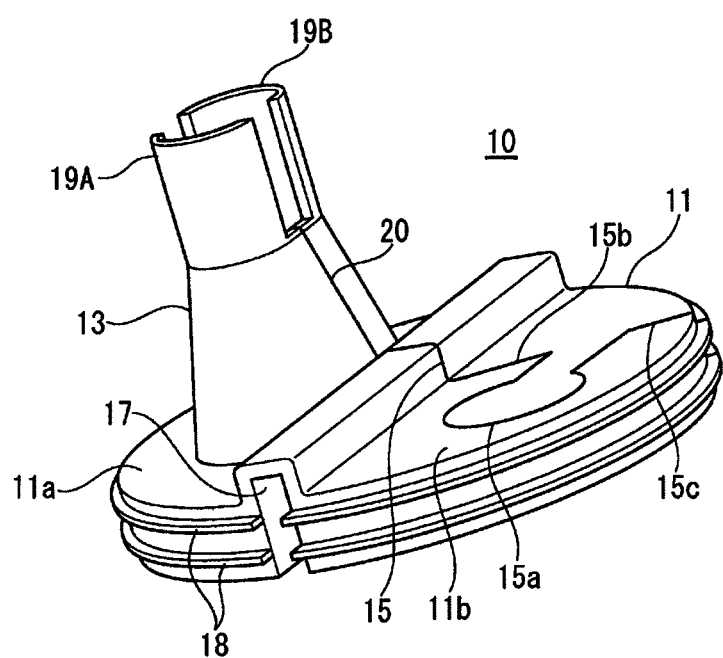
Figure 5A:
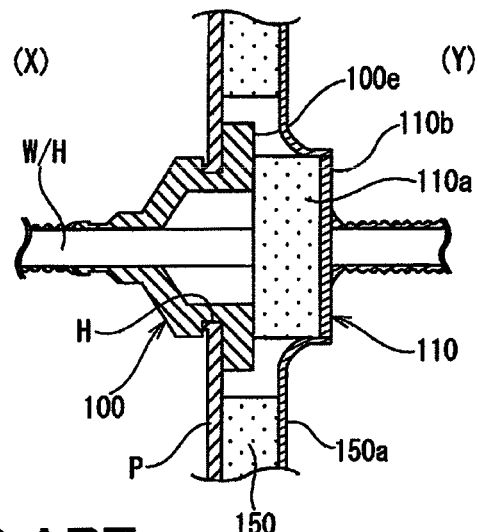
FIGS. 5A and 5B are views illustrating the conventional art example.
Figure 5B:
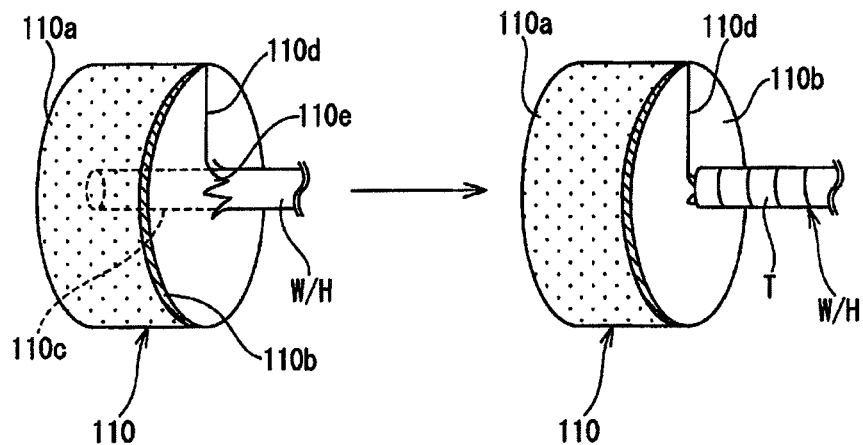
Figure 6:
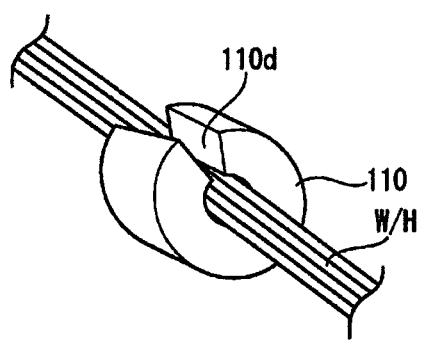
FIG. 6 is a view illustrating a non-preferred circumstance in the conventional art.

A silencer 10 configured with molded rubber components as shown in the exploded perspective views of FIGS. 2A and 2B, the side view of FIG. 3A, and the front view of FIG. 3B, is fitted within the interior of the grommet 1.

The silencer 10 includes a flat circular piece 11 blocking a central cavity of the large diameter tubular portion 3 of the grommet 1 in a direction substantially orthogonal to an axis thereof. A wire harness insertion hole 12 is provided eccentric to the flat circular piece 11, and a small diameter tubular portion 13 is provided protruding from the peripheral edge of the wire harness insertion hole 12. The small diameter tubular portion 13 enables insertion by matching to a position on the small diameter tubular portion 2 of the grommet 1 in a state where the flat circular piece 11 is fitted within the large diameter tubular portion 3 of the grommet 1.

The flat circular piece 11 of the silencer 10 includes a slit 15 from the wire harness insertion hole 12 to the outer peripheral surface of the flat circular piece 11. The slit 15 includes between both ends an irregularly shaped line portion 15a having a keyhole-shaped line to inhibit separation. The keyhole-shaped irregularly shaped line portion 15a is configured with parallel lines 15a1 and 15a2 bending in an orthogonal direction from radial-direction straight lines 15b and 15c, respectively, which continue to both sides, as well as a continuous curving line 15a3 bulging outward from front ends of the parallel lines 15a1 and 15a2. In other words, having a line in which the curved line 15a3 traces a head portion A, and the parallel lines 15a1 and 15a2 trace a neck portion B. By having the irregularly shaped line portion 15a, even when bearing a separation force in the direction of an arrow S shown in FIG. 3B, the head portion A is not able to pass through the neck portion B, and thus separation is inhibited and the development of positioning drift at the slit 15 can be prevented. For example, an enlargement E may be provided having a dimension larger than a dimension (e.g., a dimension defined by a distance between 15a1 and 15a3) of the recess (i.e., defined By the shaped of the irregularly shaped line portion 15a) such that the enlargement E is unable to pass through a front end of the recess. The enlargement mat, for example, include a circular portion Ea and a norrow extending portion Eb integrally connecting the circular portion Ea to the second opposing side of the flat circular piece, as illustrated in FIG. 3A.

Moreover, the silencer 10 includes a diameter-direction concavity 17 on the flat circular piece 11. In addition, the silencer 10 includes annular ribs 18 on the outer peripheral surface of the flat circular piece 11, segmented by the concavity 17, and fitting tightly to the inner peripheral surface of the large diameter tubular portion 3 of the grommet 1. The wire harness insertion hole 12 is provided to an eccentric position on one half-circle portion 11a segmented by the concavity 17, and the small diameter tubular portion 13 is provided projecting from the peripheral edge of the wire harness insertion hole 12. The slit 15 is orthogonal to the concavity 17 and extends in the other half-circle portion 11b. The irregularly shaped line portion 15a is provided on the half-circle portion 11b.

The small diameter tubular portion 13 of the silencer 10 projects from the peripheral edge of the wire harness insertion hole 12 and the diameter thereof constricts in a conical shape. Bisected half-circular ring-shaped tape-winding tongue tabs 19A and 19B are provided projecting from the front end of the small diameter portion 13. In addition, an extended slit 20 is provided to the small diameter tubular portion 13 in an axial line direction and continuous with the slit 15.

The attachment of the wire harness W/H to the grommet 1 and the silencer 10 first opens the slit 15 on the flat circular piece 11 of the silencer 10 and the extended slit 20 of the small diameter tubular portion 13, then the wire harness W/H is inserted sideways in a direction substantially orthogonal to an axis thereof. The wire harness W/H is then passed through the wire harness insertion hole 12 and the small diameter tubular portion 13 on the silencer 10. The inserted wire harness W/H is wound by adhesive tape (not shown in the drawings) along with the tape winding tongue tabs 19A and 19B on the front end of the small diameter tubular portion 13, thus fixating the wire harness W/H to the silencer 10.

Next, the wire harness W/H which has been attached to the silencer 10 is inserted through the grommet 1. At that point, while spreading the small diameter tubular portion 2 with a spreading jig (not shown in the drawings), the wire harness W/H is passed therethrough, and the small diameter portion 13 of the silencer 10 is also inserted into the small diameter portion 2. At the time of insertion, the flat circular piece 11 is pressed into the large diameter tubular portion 3 of the grommet 1 and the annular ribs 18 on the outer periphery of the flat circular piece 11 are pressed against the inner peripheral surface thereof. The interior of the large diameter tubular portion 3 of the grommet 1 is thus sealed in a blocked state by the flat circular piece 11 of the silencer 10. Accordingly, a sealed space is formed within the large diameter tubular portion 3 of the grommet 1, which can function to increase the sound insulation performance.

In this way, the wire harness W/H is routed in a vehicle in a state where the grommet 1 and the silencer 10 are assembled to the wire harness W/H. As shown in FIG. 1B, after the wire harness W/H is passed through the grommet 1 into a through-hole H on a divider panel P from the engine compartment X side to the cabin interior Y side, the wire harness W/H which has been passed through the grommet 1 is pulled back to the engine compartment X side to engage the through-hole H of the divider panel P.

In this state, the silencer 10 is fitted within the interior of the large diameter tubular portion 3 of the grommet 1 and, therefore, noise transmitted from the engine compartment X to the cabin interior Y can be blocked by the silencer 10 and thus reduced.

In addition, the slit 15 is provided with the irregularly shaped line portion 15a. Even when the shape of the grommet 1 deforms when the grommet 1 is mounted in the through-hole H and when the shape of the silencer 10 within the grommet 1 is deformed, positioning drift can thus be prevented from developing at the slit 15. Similarly, after the grommet 1 is mounted to the through-hole H, even when the shape of the silencer 10 is deformed by application of a load such as pulling force on the wire harness W/H, positioning drift can be prevented from developing at the slit 15. Accordingly, there is no risk that a gap through which sound leaks will develop due to the development of positioning drift, and sound insulation performance can be improved.

A second embodiment is illustrated in FIG. 4. In the second embodiment, a grommet (not shown in the drawings) includes a wire harness insertion hole in a center thereof, and a small diameter tubular portion is continuous to a large diameter tubular portion. Accordingly, the wire harness insertion hole 12 provided on the flat circular piece 11 of the silencer 10 is also provided in the center thereof. The slit 15 is provided extending in the radial direction from the wire harness insertion hole 12. The irregularly shaped line portion 15a is provided midway on the slit 15, and the irregularly shaped line portion 15a has a dovetail groove shape. Other components are similar to the first embodiment. As described above, in a case where the irregularly shaped line portion of the slit 15 has a dovetail groove shape, as with the keyhole shape, the two pieces are less likely to separate from one another, and the development of positioning drift can be reduced and prevented. For example, the enlargement E may be provided as a dovetail shaped portion as illustrated in FIG. 4. Other shapes and effects are similar to the first embodiment, and thus a description thereof is omitted.

The present invention is not limited to the above-described embodiments. For example, the small diameter tubular portion need not necessarily project from the peripheral edge of the wire harness insertion hole, and the like. A variety of configurations are included in a scope which does not deviate from the substance of the present invention.

DESCRIPTION OF REFERENCE NUMERALS 1 grommet
2 small diameter tubular portion
3 large diameter tubular portion
10 silencer
11 flat circular piece
12 wire harness insertion hole
13 small diameter portion
15 slit
15a irregularly shaped line portion
P divider panel
H through-hole
W/H wire harness
X engine compartment
Y cabin interior

The invention claimed is:
1. A grommet having a silencer, wherein:
the grommet is configured to be mounted on a wire harness routed through a through-hole in a vehicle body panel from an engine compartment side to a cabin interior side of an automobile, the grommet comprising:
a small diameter tubular portion to which a wire harness is configured to be tightly fitted and inserted therethrough; and
a large diameter tubular portion continuous to one end of the small diameter tubular portion, the large diameter tubular portion provided on an outer peripheral surface with a vehicle body engagement concavity configured to be tightly fitted to a peripheral edge of the through-hole;
the silencer is made of rubber and is inserted into and fitted within the large diameter tubular portion, the silencer comprising:
a flat circular piece blocking a central cavity of the large diameter tubular portion in a direction substantially orthogonal to an axis thereof;
a wire harness insertion hole provided on the flat circular piece and communicating with the small diameter tubular portion of the grommet; and
a slit extending from the wire harness insertion hole to an outer peripheral surface of the flat circular piece in order to allow sideways insertion of the wire harness into the wire harness insertion hole, wherein
the slit comprises:
an irregularly shaped line portion that defines a recess in a first opposing side of the flat circular piece that borders the slit and defines an enlargement on a second opposing side of the flat circular piece that borders the slit, the recess and the enlargement inhibiting separation of the flat circular piece, wherein the enlargement has a dimension larger than a dimension of the recess such that the enlargement is unable to pass through a front end of the recess.

2. The grommet according to claim 1, wherein:

a diameter-direction concavity is provided on the flat circular piece of the silencer so as to segment the flat circular piece;

annular ribs which are tightly fitted to the inner peripheral surface of the large diameter tubular portion of the grommet are provided on the outer peripheral surface of the flat circular piece segmented by the concavity;

the wire harness insertion hole is provided eccentrically in an eccentric position in a first half-circle portion segmented by the concavity;

the slit is orthogonal to the concavity and is extended into a second half-circle portion; and the irregularly shaped line portion is provided in the second half-circle portion.

3. The grommet according to claim 2, wherein:

the silencer includes a small diameter tubular portion protruding from the peripheral edge of the wire harness insertion hole;

an extended slit continuous with the slit is provided in the small diameter tubular portion of the silencer in an axial line direction; and the small diameter tubular portion of the silencer is fitted within the small diameter tubular portion of the grommet.

4. The grommet according to claim 1, wherein:

the silencer includes a small diameter tubular portion protruding from the peripheral edge of the wire harness insertion hole;

an extended slit continuous with the slit is provided in the small diameter tubular portion of the silencer in an axial line direction; and the small diameter tubular portion of the silencer is fitted within the small diameter tubular portion of the grommet.

5. The grommet according to claim 1, wherein the enlargement comprises a circular portion and a narrow extending portion integrally connecting the circular portion to the second opposing side of the flat circular piece.

6. The grommet according to claim 1, wherein the enlargement comprises a dovetail shaped portion.

* * * * *